US010890926B2

(12) United States Patent
McNair et al.

(10) Patent No.: US 10,890,926 B2
(45) Date of Patent: Jan. 12, 2021

(54) SYSTEMS AND METHODS FOR EXECUTING AIRCRAFT TAKE-OFF AND LANDING EVENTS

(71) Applicant: Bell Helicopter Textron Inc., Fort Worth, TX (US)

(72) Inventors: Michael Kevin McNair, Weatherford, TX (US); Andrew Vincent Louis, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 136 days.

(21) Appl. No.: 16/121,038

(22) Filed: Sep. 4, 2018

(65) Prior Publication Data

US 2020/0073412 A1 Mar. 5, 2020

(51) Int. Cl.
*G05D 1/10* (2006.01)
*G05D 1/06* (2006.01)
*B64D 45/04* (2006.01)
*G05D 1/02* (2020.01)

(52) U.S. Cl.
CPC ............. *G05D 1/102* (2013.01); *B64D 45/04* (2013.01); *G05D 1/0653* (2013.01); *G05D 1/0202* (2013.01)

(58) Field of Classification Search
CPC .... G05D 1/102; G05D 1/0653; G05D 1/0202; B64D 45/04
See application file for complete search history.

(56) References Cited

U.S. PATENT DOCUMENTS

| 6,193,190 | B1* | 2/2001 | Nance ................... B64F 1/007 244/114 R |
| 8,918,234 | B2 | 12/2014 | Covington et al. |
| 9,020,666 | B2* | 4/2015 | Ohtomo ............... G05D 1/0669 701/15 |
| 9,174,747 | B2* | 11/2015 | Kang ..................... B64F 1/18 |
| 9,904,283 | B2* | 2/2018 | Liu ..................... G05D 1/0011 |
| 10,061,328 | B2* | 8/2018 | Canoy ................. G08G 5/0056 |
| 10,395,544 | B1* | 8/2019 | Harris ................. G08G 5/0069 |

(Continued)

OTHER PUBLICATIONS

Wikipedia, "Heliport," <https://en.wikipedia.org/wiki/Heliport> Retrieved: Aug. 22, 2018.

*Primary Examiner* — Nicholas K Wiltey
*Assistant Examiner* — Tiffany K Luu
(74) *Attorney, Agent, or Firm* — Shackelford, Bowen, McKinley & Norton, LLP

(57) ABSTRACT

In one embodiment, a method is performed by a computer system in an aircraft. The method includes receiving an advance indication of a take-off or landing event to be executed by the aircraft in proximity to a landing area such that the landing area includes an arrangement of a plurality of emitters of electromagnetic radiation. The method further includes, responsive to the receiving, detecting, via a sensor in communication with the computer system, emission states of at least some of the plurality of emitters. In addition, the method includes transforming the detected emission states into an instruction set for the take-off or landing event. The method also includes initiating monitoring of the aircraft relative to the instruction set as the aircraft executes the take-off or landing event in proximity to the landing area.

9 Claims, 8 Drawing Sheets

(56) References Cited

U.S. PATENT DOCUMENTS

| | | | |
|---|---|---|---|
| 2012/0078451 A1* | 3/2012 | Ohtomo | G01S 5/16 |
| | | | 701/15 |
| 2016/0207637 A1* | 7/2016 | Campillo | B64C 39/024 |
| 2016/0272306 A1 | 9/2016 | Roberts | |
| 2016/0340056 A1* | 11/2016 | Mariani | G08G 5/025 |
| 2016/0378121 A1 | 12/2016 | Shue | |
| 2017/0197710 A1* | 7/2017 | Ma | B64C 13/20 |
| 2017/0212528 A1* | 7/2017 | Henderson | B64F 1/00 |
| 2017/0320593 A1* | 11/2017 | Van Beest | E01F 3/00 |
| 2018/0357910 A1* | 12/2018 | Hobbs | G01S 3/32 |
| 2019/0248511 A1* | 8/2019 | Lewis | H05B 45/00 |
| 2019/0339720 A1* | 11/2019 | Petersen | G08G 5/0013 |

* cited by examiner

SYSTEMS AND METHODS FOR EXECUTING AIRCRAFT TAKE-OFF AND LANDING EVENTS

BACKGROUND

Technical Field

The present disclosure relates generally to aircraft control and more particularly, but not by way of limitation, to systems and methods for executing aircraft take-off and landing events.

History of Related Art

Aircraft such as helicopters frequently land on helipads. Helipads may be located at a heliport or airport where fuel, air traffic control and service facilities for aircraft are available. Most helipads are located remote from populated areas due to sounds, winds, space and cost constraints, however, some skyscrapers maintain a helipad on their roofs in order to accommodate air taxi services. Some basic helipads are built on high-rise buildings for evacuation in case of a major fire outbreak. Major police departments may use a dedicated helipad at heliports as a base for police helicopters. Large ships and oil platforms usually have a helipad on board for emergency use. Helipads are also common features at hospitals where they serve to facilitate medical evacuation or air ambulance transfers of patients to trauma centers or to accept patients from remote areas without local hospitals or facilities capable of providing the level of emergency medicine required. In urban environments, these heliports are typically located on the roof of the hospital.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one embodiment, a method is performed by a computer system in an aircraft. The method includes receiving an advance indication of a take-off or landing event to be executed by the aircraft in proximity to a landing area such that the landing area includes an arrangement of a plurality of emitters of electromagnetic radiation. The method further includes, responsive to the receiving, detecting, via a sensor in communication with the computer system, emission states of at least some of the plurality of emitters. In addition, the method includes transforming the detected emission states into an instruction set for the take-off or landing event. The method also includes initiating monitoring of the aircraft relative to the instruction set as the aircraft executes the take-off or landing event in proximity to the landing area.

In one embodiment, a method is performed by a computer system. The method includes receiving an advance indication of a take-off or landing event to be executed by an aircraft in proximity to a landing area such that the landing area includes an arrangement of a plurality of emitters of electromagnetic radiation and such that the plurality of emitters are in communication with the computer system. The method further includes, responsive to the receiving, generating an instruction set for the take-off or landing event. In addition, the method includes transforming the instruction set into emission states of at least selected emitters of the plurality of emitters. The method also includes causing the selected emitters to produce emissions in correspondence to the emission states.

In one embodiment, a computer-program product includes a non-transitory computer-usable medium having computer-readable program code embodied therein, the computer-readable program code adapted to be executed to implement a method. The method includes receiving an advance indication of a take-off or landing event to be executed by the aircraft in proximity to a landing area such that the landing area includes an arrangement of a plurality of emitters of electromagnetic radiation. The method further includes, responsive to the receiving, detecting, via a sensor in communication with the computer system, emission states of at least some of the plurality of emitters. In addition, the method includes transforming the detected emission states into an instruction set for the take-off or landing event. The method also includes initiating monitoring of the aircraft relative to the instruction set as the aircraft executes the take-off or landing event in proximity to the landing area.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
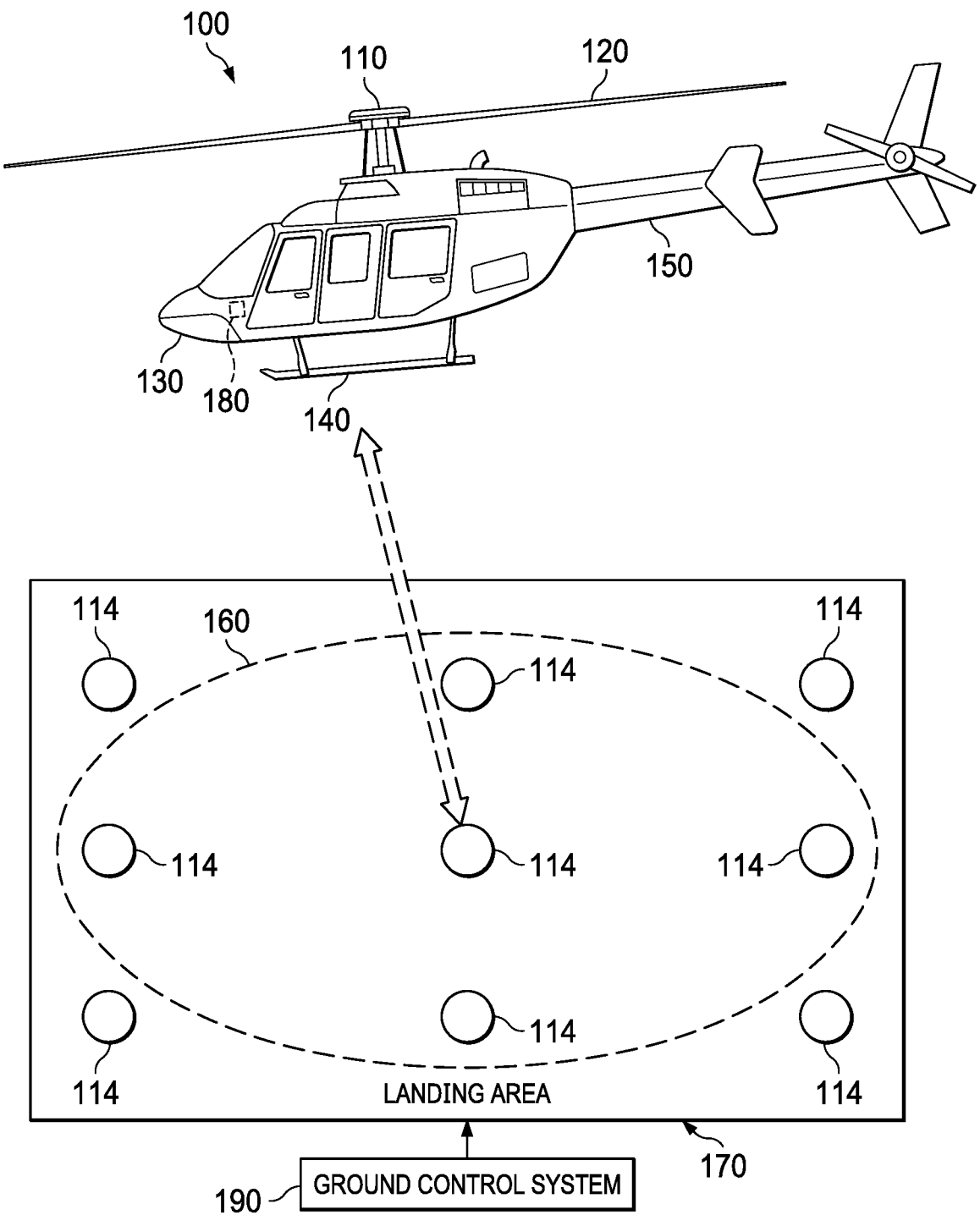
FIG. 1 illustrates an aircraft in proximity to a landing area controlled by a ground control system.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Vertical take-off and landing (VTOL) aircraft frequently land in, and take-off from, landing areas sometimes referred to as heliports. VTOL aircraft can include, for example, any type of aircraft that can hover, take-off and land vertically or near vertically. In various embodiments, VTOL aircraft can be piloted by an on-board pilot, can be remotely piloted and/or can fly autonomously. Examples of VTOL aircraft include, but are not limited to, various types and sizes of fixed-wing aircraft, tiltwing aircraft, helicopters and tiltrotors.

VTOL aircraft can present particular challenges relative to take-off and landing. Individual instances of taking off or landing are periodically referred to herein as take-off events and landing events, respectively. Execution of a landing event can involve, for example, an aircraft requesting to land in a landing area, ground control authorizing the landing and the aircraft landing in the landing area as directed by ground control. In similar fashion, execution of a take-off event can involve, for example, an aircraft requesting to take-off from a landing area, ground control authorizing the take-off and the aircraft taking off from the landing area as directed by ground control.

Although landing areas are often large enough, in theory, to simultaneously accommodate many VTOL aircraft, maximizing use of physical space at the landing area, in consideration of real-time needs of VTOL aircraft, is technically challenging. VTOL aircraft exist in a variety of different sizes and shapes and, as such, appropriate locations within the landing area for take-off or landing events can vary with the sizes and shapes of the aircraft. Further, real-time environmental conditions such as weather and real-time operational conditions such as aircraft failure can trigger a need to radically reorganize how the landing area is used. A configuration that is satisfactory now might not be satisfactory ten minutes from now. Efforts to accommodate diverse VTOL aircraft and rapidly-changing conditions can compromise the efficient use of physical space in VTOL landing areas.

Various embodiments described herein can address the above technical challenges by implementing a communication protocol at a landing area controlled by a ground control system. In certain embodiments, in response to an advance indication of a take-off or landing event to be executed by a VTOL aircraft, the ground control system can dynamically generate an instruction set that directs a particular aircraft in its execution of a particular take-off or landing event. The instruction set can be conveyed to the VTOL aircraft by way of an arrangement of emitters disposed at the landing area. Thereafter, the instruction set can be detected by the aircraft via sensors in use on the aircraft. Advantageously, in certain embodiments, the instruction set can be dynamically changed or updated in response to new information such as environmental or operational conditions, thereby facilitating efficient use of the landing area.

FIG. 1 illustrates an aircraft 100 in proximity to a landing area 170 controlled by a ground control system 190. In various embodiments, the aircraft 100 can execute a take-off or landing event within the landing area 170 in accordance with instructions from the ground control system 190. For illustrative purposes, the aircraft 100 is shown to be a rotorcraft. In various embodiments, the landing area 170 can correspond to a heliport, a helipad or a vertiport.

Aircraft 100 features a rotor system 110, blades 120, a fuselage 130, a landing gear 140 and an empennage 150. Rotor system 110 may rotate blades 120. Rotor system 110 may include a control system for selectively controlling the pitch of each blade 120 in order to selectively control direction, thrust and lift of aircraft 100. Fuselage 130 represents the body of aircraft 100 and may be coupled to rotor system 110 such that rotor system 110 and blades 120 may move fuselage 130 through the air. Landing gear 140 supports aircraft 100 when aircraft 100 is landing and/or when aircraft 100 is at rest on the ground. Empennage 150 represents the tail section of the aircraft. Teachings of certain embodiments relating to rotor systems described herein may apply to rotor system 110 and/or other rotor systems, such as other tilt rotor and helicopter rotor systems. It should also be appreciated that teachings from aircraft 100 may apply to aircraft other than rotorcraft, such as airplanes and unmanned aircraft, to name a few examples.

A flight control system 180 is schematically shown in fuselage 130, but it should be appreciated that the flight control system 180 may take a number of forms and exist in a variety of locations within aircraft 100. Flight control system 180 can function as a fly-by-wire control system and, in a typical embodiment, is configured to control and communicate with various systems within aircraft 100 including, for example, one or more pilot flight controls. A pilot may manipulate pilot flight controls in order to achieve controlled aerodynamic flight. Inputs provided by the pilot to the pilot flight controls may be transmitted electronically to the flight control system 180. The flight control system 180 can include, represent or be communicably coupled to devices operable to change the flight characteristics of the aircraft such as, for example, the positions of blades 120 of FIG. 1.

In the illustrated embodiment, the landing area 170 includes an arrangement of emitters 114. One skilled in the art will appreciate that the number and placement of the emitters 114 within the landing area 170 is illustrative in nature, and that FIG. 1 is not intended to provide a scaled representation of the depicted elements. For simplicity of illustration, the emitters 114 are shown as being separate from the ground control system 190. However, in some embodiments, the emitters 114 can be integral parts of the ground control system 190. In various embodiments, the emitters 114 are each operable to emit electromagnetic radiation corresponding to various frequencies throughout the electromagnetic spectrum, such as radio waves, infrared light, visible light, combinations of same and/or the like.

In various embodiments, the ground control system 190 can establish a set of emission states for the emitters 114 and individually control the emitters 114 to produce emissions in correspondence to the emission states. The emission states can include a state in which no emission is produced, states in which, for example, light of a specific color, hue and/or brightness is produced, states in which light of a specific color, hue and/or brightness is configurably flashed (e.g., blinking states) and/or other states. More generally, it should be appreciated that the emission states can configurably correspond to frequencies throughout the electromagnetic spectrum, inclusive of visible light, infrared light, ultraviolet light, combinations of same and/or the like.

At any given time, the emission states of the emitters 114, as directed by the ground control system 190, can collectively convey an instruction set relative to a take-off or landing event to be executed by the aircraft 100. The instruction set can define, for example, a region 160 within the landing area 170 in which the aircraft 100 will execute a take-off or landing event. In a landing context, the instruction set can further indicate, for example, an orientation of the aircraft 100 within the region 160, a direction or location for passenger disembarkation or cargo unloading, combinations of the foregoing and/or the like. In a take-off context, the instruction set can further indicate, for example, a direction for initial flight heading, a direction or location for passenger embarkation or cargo loading, combinations of the foregoing and/or the like. In certain embodiments, the flight control system 180 of the aircraft 100, in conjunction with sensors on the aircraft 100, can detect the emission states and thereby derive the instruction set.

Figure 2:
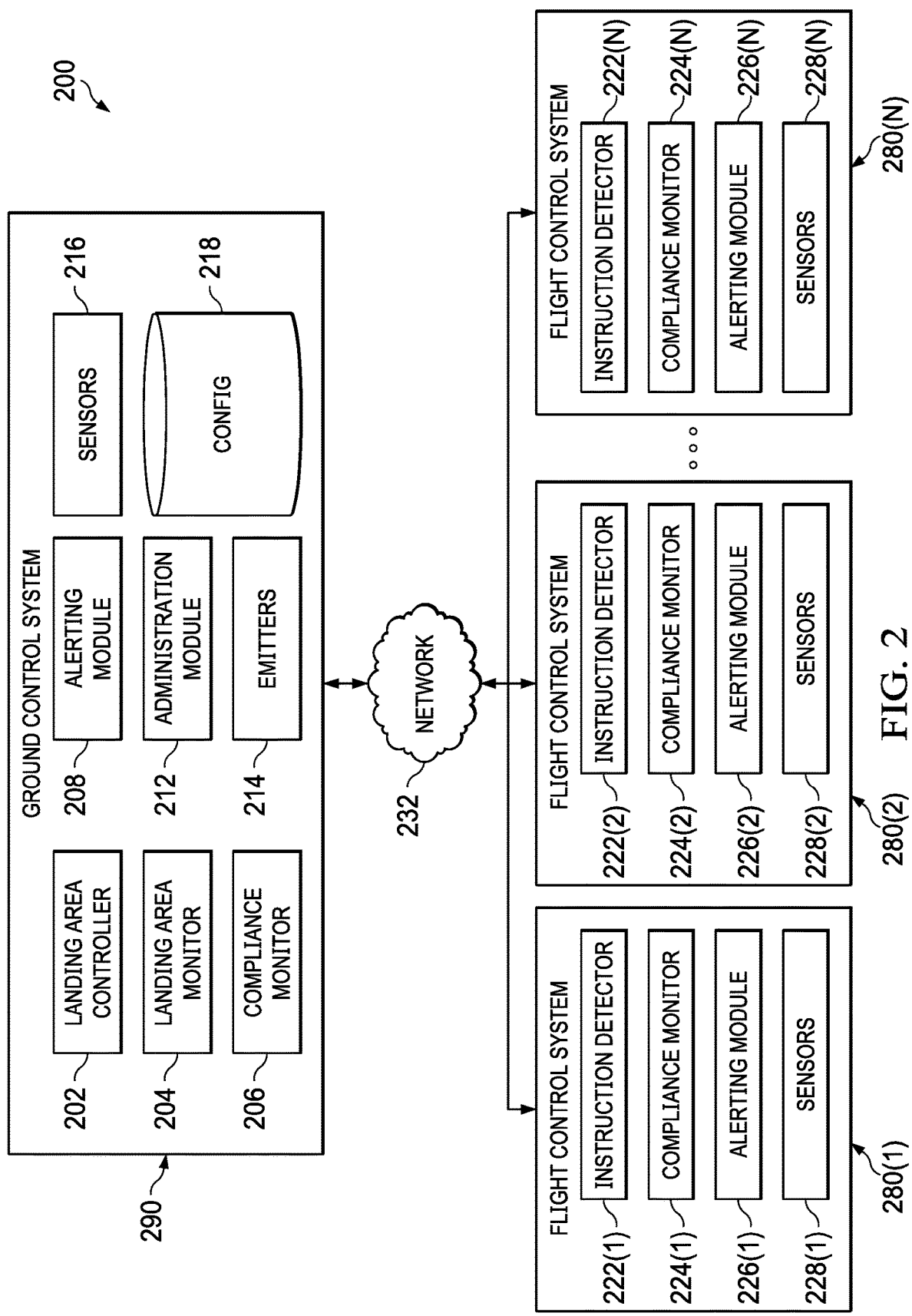
FIG. 2 illustrates an example of a system for executing take-off and landing events.

FIG. 2 illustrates an example of a system 200 for executing take-off and landing events. The system 200 includes a ground control system 290 and three flight control systems, namely, flight control systems 280(1), 280(2) and 280(N) (collectively, flight control systems 280). The flight control systems 280 and the ground control system 290 can communicate over a network 232.

The network 232 can include any form of communication between components. It should be appreciated that the network 232 is intended to abstract a plurality of networks over which such communication may occur. In particular, the network 232 logically represents all communication infrastructure for connecting, for example, the ground control system 290, to each of the flight control systems 280. The network 232 can include any number of communications networks such as, for example, public or private intranets, the Internet, public switched telephone networks (PSTNs), cellular networks, satellite communication, radio communication and the like.

In general, the flight control systems 280 can each correspond to an aircraft such as, for example, the aircraft 100 of FIG. 1, and can each operate similarly to the flight control system 180 of FIG. 1. The flight control systems 280 are shown in a quantity of three solely for purposes of illustration. It should be appreciated that the flight control systems 280 can exist in any suitable quantity and that the quantity can be variable and dynamic in dependence upon factors such as a size of a landing area controlled by the ground control system 290 and a number of aircraft requesting take-off or landing at any given time. Furthermore, the flight control systems 280 can, but need not, correspond to flight control computers. In various embodiments, the flight control systems 280 can each include one, two, three or any other suitable number of flight control computers.

The ground control system 290 can operate similarly to the ground control system 190 of FIG. 1. In certain embodiments, the ground control system 290 controls and manages a landing area such as the landing area 170 of FIG. 1. The ground control system 290 is shown to include a landing area controller 202, a landing area monitor 204, a compliance monitor 206, an alerting module 208, an administration module 212, emitters 214, sensors 216 and configurations 218.

The emitters 214 can emit electromagnetic radiation as described relative to the emitters 114 of FIG. 1 and can be arranged in any suitable fashion as described with respect to FIG. 1. In some cases, the emitters 214 can be arranged in a graph or grid-like manner such that each of the emitters 214 can, in effect, correspond to a coordinate or cell of a graph or grid.

The sensors 216 can include, for example, proximity sensors, video cameras and/or other types of sensors operable to detect approaching objects such as aircraft. In some embodiments, the sensors 216 can be distributed throughout the landing area in similar fashion to the emitters 214, such that each emitter of the emitters 214 is located alongside a sensor of the sensors 216. Further, in some cases, at least some of the sensors 216 can be located in a common housing with an emitter of the emitters 114.

In certain embodiments, the sensors 216 can monitor real-time environmental conditions, such as weather conditions, that negatively impact visibility and/or safety for take-off and landing events. In some cases, the real-time environmental conditions can be directly detected by the sensors 216 in the form of measurements or analysis produced at the landing area. For example, the sensors 216 can include pressure sensors, cloud-height sensors, visibility sensors, wind sensors, temperature sensors, dew-point sensors, relative humidity sensors, lightning or thunder-storm sensors, precipitation-type sensors, precipitation-occurrence sensors, freezing-rain sensors, precipitation-accumulation sensors, snow-depth sensors, day/night sensors, combinations of the foregoing and/or the like. In addition, or alternatively, the sensors 216 can indirectly detect the real-time environmental conditions by pulling weather-related information similar to the foregoing from external data sources over the network 232.

The landing area controller 202 can include configurable logic for generating instruction sets for landing and/or take-off events. In some embodiments, the instruction sets can be generated automatically. In other embodiments, the instruction sets can be generated based on received user input that specifies particular instructions. In still other embodiments, the instruction sets can be generated using a combination of automatic generation and user specification. Examples of automatic generation will be described below.

In an example, the landing area controller 202 can automatically determine, as an automatically-generated instruction, a particular region within the landing area for a take-off or landing event involving a particular aircraft. The landing area controller 202 can execute configurable region-selection logic that, in response to being provided inputs about a particular aircraft, outputs specific regions of the landing area that can accommodate the particular aircraft. The inputs can include any information usable to assess aircraft size such as, for example, an aircraft model and/or one or more aircraft dimensions such as length, width and wingspan. The specific regions of the landing area can be expressed in terms of coordinates or cells, with particular reference to the landing area as a graph or grid as described previously. Additionally, the configurable region-selection logic can designate an order of priority or preference for the specific regions. In this manner, the landing area controller 202 can select the highest priority, or most preferred, of the specific regions that is available for use.

In another example, the landing area controller 202 can automatically generate additional instructions for a take-off or landing event based on certain criteria such as: (1) a particular region of the landing area that has been automatically or manually selected; and/or (2) an overall state of the landing area at a particular time. The overall state of the landing area can be expressed, for example, with reference to the landing area as a graph or grid as described previously. Each cell or coordinate of the graph or grid can be indicated as active or inactive, for example, based on whether the cell or coordinate is part of a region that has been assigned to another aircraft either at the particular time or within a configurable range of the particular time. According to this example, the landing area controller 202 can execute logic that outputs the additional instructions in response to receiving the particular region of the landing area and/or the overall state of the landing area. In a landing context, the additional instructions can include, for example, a desired orientation of an aircraft within the particular region, a direction or location for passenger disembarkation or cargo unloading and/or other instructions. In a take-off context, the additional instructions can include, for example, a direction for initial flight heading, a direction or location for passenger embarkation or cargo loading and/or other instructions.

In various embodiments, the logic described above, including the configurable region-selection logic and the logic for generating the additional instructions, can be stored in the configurations 218. In these embodiments, the logic can be accessed and implemented by the landing area controller 202 during execution. In some embodiments, all or a portion of the logic can be implemented as one or more preconfigured lookup tables.

In addition to the above-described functionality, the landing area controller 202 can be communicably coupled to the emitters 214 so as to individually control the emitters 214. In various embodiments, the landing area controller 202 can establish, or access, a set of emission states for each of the emitters 214 as described with respect to FIG. 1, and can variably cause each of the emitters 214 to produce emissions corresponding to a suitable emission state from the set. The set of emission states can include, for example, a state in which no emission is produced, states in which, for example, light of a specific color, hue and/or brightness is produced, states in which light of a specific color, hue and/or brightness is configurably flashed (e.g., blinking states) and/or other states. The set of emission states can be stored in, and accessed from, the configurations 218.

In various embodiments, the landing area controller 202 can transform the instruction sets into particular emission states of particular emitters of the emitters 214. The transformation can involve translating or converting the generated instruction sets into the particular emission states using, for example, transformation logic stored in the configurations 218. In some embodiments, the transformation logic can involve applying mapping rules. In general, the transformation conforms to a communication protocol that has been pre-arranged with the flight control systems 280. Thereafter, the landing area controller 202 can cause the particular emitters to produce emissions corresponding to the particular states and thereby convey the instruction sets.

The landing area monitor 204 can maintain the above-described overall state of the landing area, including instruction sets, and monitor the landing area for trigger events that might change the overall state. In general, a trigger event can represent newly-obtained information which indicates that action should be taken relative to the landing area. For example, in some embodiments, a trigger event can be used to trigger new or updated generation of instruction sets by the landing area controller 202. Criteria for establishing trigger events can be configurable and set forth in the configurations 218.

In an example, using the sensors 216, the landing area monitor 204 can monitor for and detect, as trigger events, weather events such as fog, low clouds, lightning, gusty wind, heavy rain or snow, localized heavy rain, combinations of the foregoing and/or the like. The configurations 218 can include thresholds or other criteria for establishing when fog, low clouds, wind speed and rain, for example, are considered trigger events. In another example, the landing area monitor 204 can monitor communications and user input for exigencies, such as emergencies (e.g., aircraft failure) and high-priority take-off or landing events, that necessitate reconfiguring existing plans for the landing area. According to this example, an identified exigency can be a trigger event.

In yet another example, the landing area monitor 204 can monitor for a change in availability of a region or portion of a region of the landing area. The landing area monitor 204, for example, can detect a presence of aircraft or objects in the landing area that were previously absent, or the absence of aircraft or objects that were previously present. In some cases, the detected presence or absence can impact the availability of certain regions of the landing area for take-off or landing events. According to this example, the change in availability can be a trigger event. The presence or absence can be detected automatically via, for example, proximity sensors within the sensors 216, and/or via user input. In various embodiments, the landing area controller 202 can be triggered to generate a new instruction set in response to the detected presence or absence.

The compliance monitor 206 can monitor the landing area for compliance with instruction sets. In various embodiments, the compliance monitor 206 can use information from the sensors 216 and/or information received from flight control systems such as the flight control systems 280. For example, in some embodiments, the compliance monitor 206 can determine location and/or orientation of a given aircraft using the sensors 216. In another example, in some embodiments, the compliance monitor 206 can receive location, orientation and/or altitude information from the flight control systems 280 over the network 232.

The alerting module 208 can be used to present alerts responsive to events or triggers, for example, generated by the landing area controller 202, the landing area monitor 204 and/or the compliance monitor 206. In various cases, the alerting module 208 can present alerts on dashboards or transmit them over a network to a configurable set of users. The administration module 212 is operable to interact with users to modify functionality of the ground control system 290. For example, in certain embodiments, the administration module 212 can be used to modify the configurations 218. In another example, the administration module 212 can be used to modify an alerting workflow relative to the alerting module 208.

Referring now to the flight control systems 280, the flight control systems 280(1), 280(2) and 280(N) are shown to include, respectively, instruction detectors 222(1), 222(2) and 222(N), compliance monitors 224(1), 224(2) and 224(N), alerting modules 226(1), 226(2) and 226(N) and sensors 228(1), 228(2) and 228(N). For simplicity of description, example functionality of the instruction detector 222(1), the compliance monitor 224(1), the alerting module 226(1) and the sensors 228(1) will be described below, with the understanding that the same description also applies to the instruction detectors 222(2) and 222(N), the compliance monitors 224(2) and 224(N), the alerting modules 226(2) and 226(N) and the sensors 228(1), 228(2) and 228(N), respectively.

In certain embodiments, the instruction detector 222(1) is operable to detect emission states of the emitters 214 via the sensors 228(1). The sensors 228(1) can include sensors of an appropriate type to detect emissions of the emitters 214. For example, in some embodiments, the sensors 228(1) can include video cameras, including infrared video cameras, operable to detect light emitted by the emitters 214. Further, in some embodiments, the instruction detector 222 can transform the detected emission states into an instruction set for a prospective take-off or landing event to be executed by the aircraft in which the flight control system 280(1) is installed.

The compliance monitor 224(1) can monitor the aircraft to which the flight control system 280(1) corresponds for compliance with an applicable instruction set as the aircraft executes a corresponding take-off or landing event. In particular, the compliance monitor 224(1) can perform its monitoring function using information provided by the sensors 228(1). The sensors 228(1) can further include sensors of an appropriate type to provide an absolute location or position of the aircraft, an absolute orientation of the aircraft, a location or position of the aircraft relative to individual emitters of the emitters 214, an orientation of the aircraft relative to individual emitters of the emitters 214 and/or other information. For example, the sensors 228(1) can include global positioning system (GPS) sensors, attitude and heading reference system (AHRS) sensors and/or proximity sensors. For example, in certain embodiments, the compliance monitor 224(1) can use proximity sensors to determine the aircraft's location as a function of its proximity to individual emitters of the emitters 214. In many cases, the aircraft's location can thereafter be resolved to a cell or group of cells of the landing area with reference to the landing area as a graph or grid as described previously. In some cases, proximity information from two or more proximity sensors distributed throughout different sections of the aircraft can be combined to determine an orientation of the aircraft relative to individual emitters of the emitters 214.

The alerting module 226(1) can be used to present alerts responsive to events or triggers generated, for example, by the compliance monitor 224(1) or other components of the flight control system 280(1). Such alerts or triggers can also be generated by the landing area controller 202, the landing area monitor 204, the compliance monitor 206 and/or other components of the ground control system 290. In various cases, the alerting module 208 can present alerts on dashboards or transmit them over the network 232 to the ground control system 290 and/or a configurable set of users.

Figure 3:
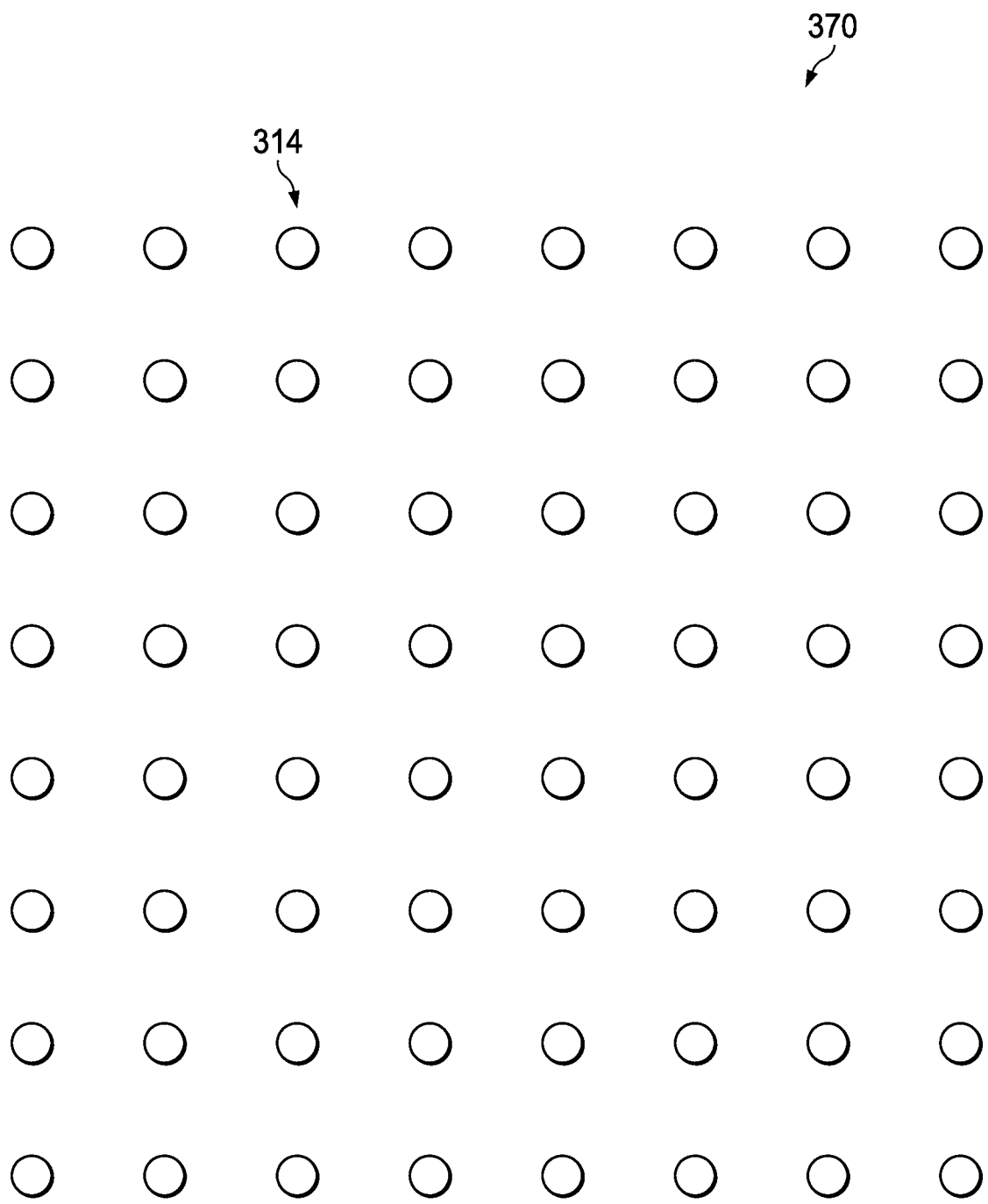
FIG. 3 illustrates an example landing area that includes an arrangement of emitters.

FIG. 3 illustrates an example landing area 370 that includes an arrangement of emitters 314. In the illustrated embodiment, the emitters 314 are arranged in a graph or grid formation. In some embodiments, the emitters 314 can each be approximately the same distance away from its up to four neighboring cells (i.e., above, below, left and right, as applicable). In an example, but not by way of limitation, the distance can be on order of twenty feet. It should be appreciated that distance can be configurable based on an expected size of aircraft to be accommodated. In the illustrated embodiment, each of the emitters 314 is producing no emissions according to a corresponding emission state in which no emissions are produced.

Figure 4A:
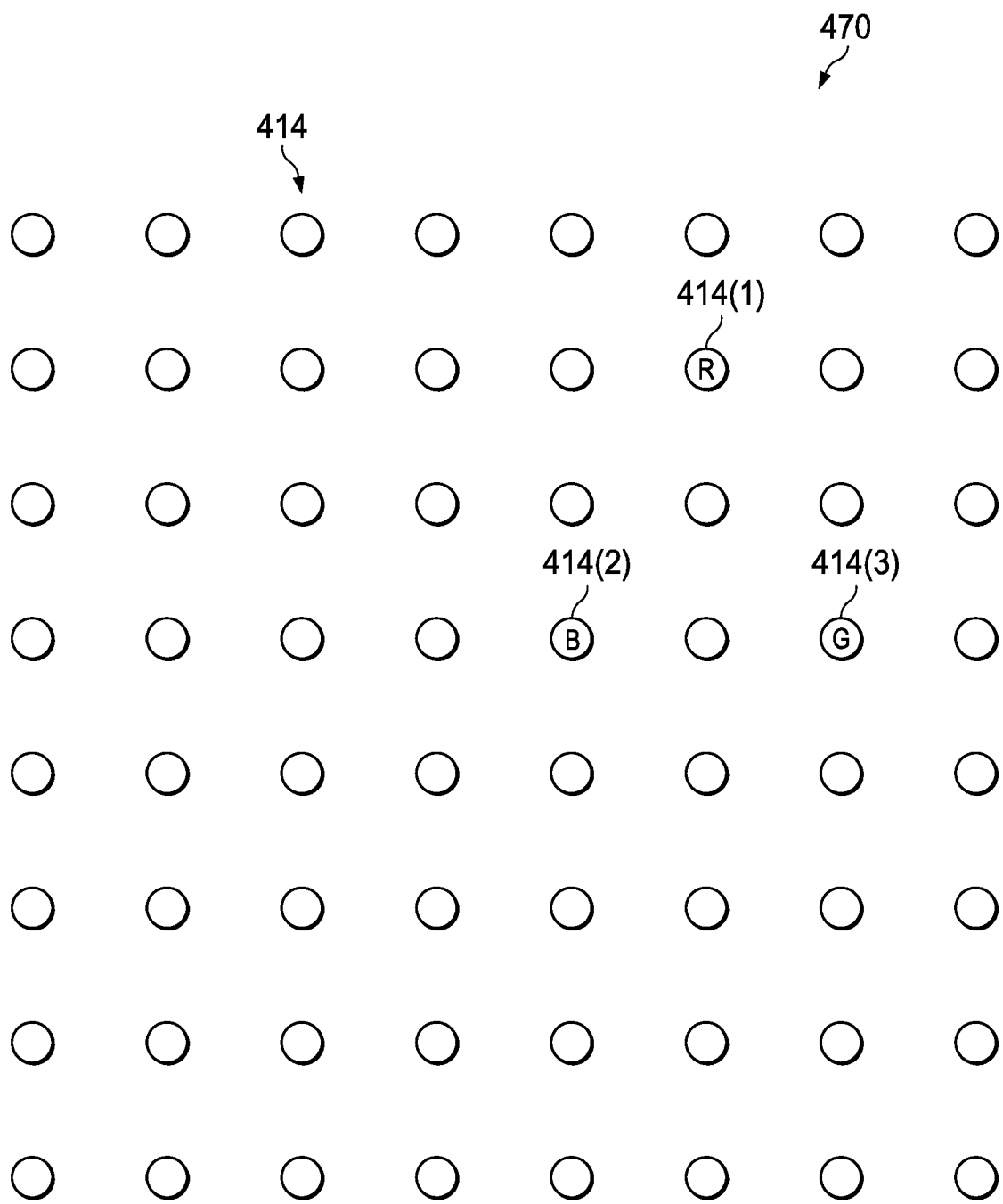
FIG. 4A illustrates an example of a landing area that includes an arrangement of emitters.

FIG. 4A illustrates an example of a landing area 470 that includes an arrangement of emitters 414. The emitters 414 can be, for example, the same emitters as the emitters 314 of FIG. 3. In the illustrated embodiment, all except three of the emitters 414 are producing no emissions according to a corresponding emission state in which no emissions are produced. Emitter 414(1) is emitting red light, emitter 414(2) is emitting blue light and emitter 414(3) is emitting green light. It should be appreciated that red light, blue light and green light are simply illustrative examples of emissions that can be individually distinguishable, for example, by sensors in use on an aircraft. As described previously, in various embodiments, the emitters 414(1), 414(2) and 414(3) can emit electromagnetic radiation corresponding to various frequencies throughout the electromagnetic spectrum, such as radio waves, infrared light, visible light, combinations of same and/or the like.

According to an example communication protocol, the emitters 414(1), 414(2) and 414(3) can convey an instruction set for a landing event to be executed by an aircraft. In one aspect, the emitters 414(1), 414(2) and 414(3) define a region within the landing area for the landing event, such that the region is at least partially bound, or demarcated, by the emitters 414(1), 414(2) and 414(3). In another aspect, the emitters 414(1), 414(2) and 414(3) can further indicate a direction or orientation of the aircraft for the landing event. In particular, the red light of the emitter 414(1) can indicate a direction of a front of the aircraft, the blue light of the emitter 414(2) can indicate a direction of a rearward port side of the aircraft and the green light of the emitter 414(3) can indicate a direction of a rearward starboard side of the aircraft.

Figure 4B:
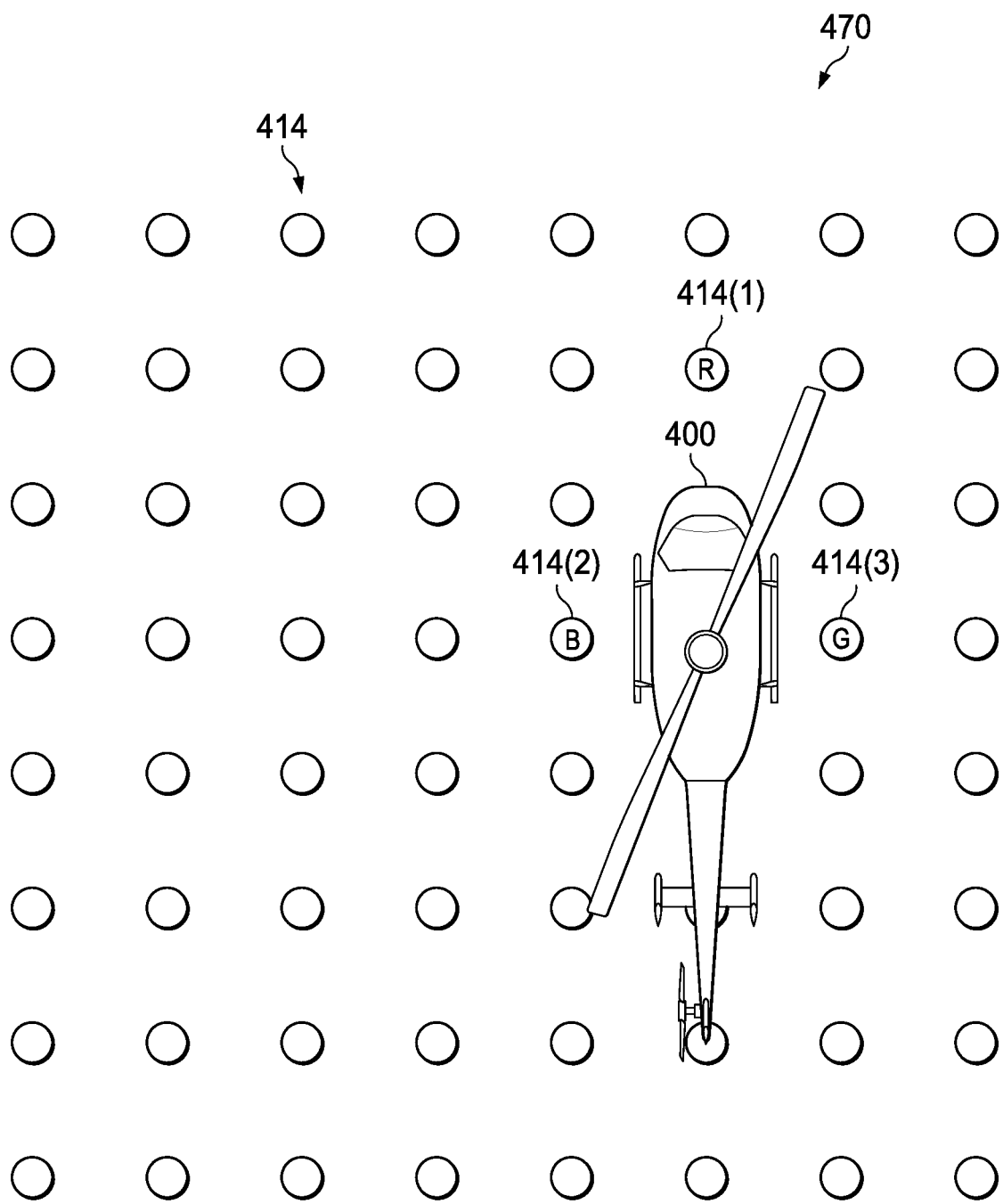
FIG. 4B illustrates an aircraft that has executed a landing event in accordance with an instruction set.

FIG. 4B illustrates an aircraft 400 that has executed a landing event in accordance with the instruction set conveyed by the landing area 470. In particular, the aircraft 400 has landed in the region defined by the emitters 414(1), 414(2) and 414(3) according to the orientation indicated by the red light emitted by the emitter 414(1), the blue light emitted by the emitter 414(2) and the green light emitted by the emitter 414(3).

In some embodiments, other types of instructions for the landing event can also be conveyed. For example, in some cases, additional emitters of the emitters 414 can be caused to emit according to a particular emission state so as to indicate a direction of passenger disembarkation or cargo unloading. Other types of instructions for a landing event will be apparent to one skilled in the art after reviewing the present disclosure.

Figure 5:
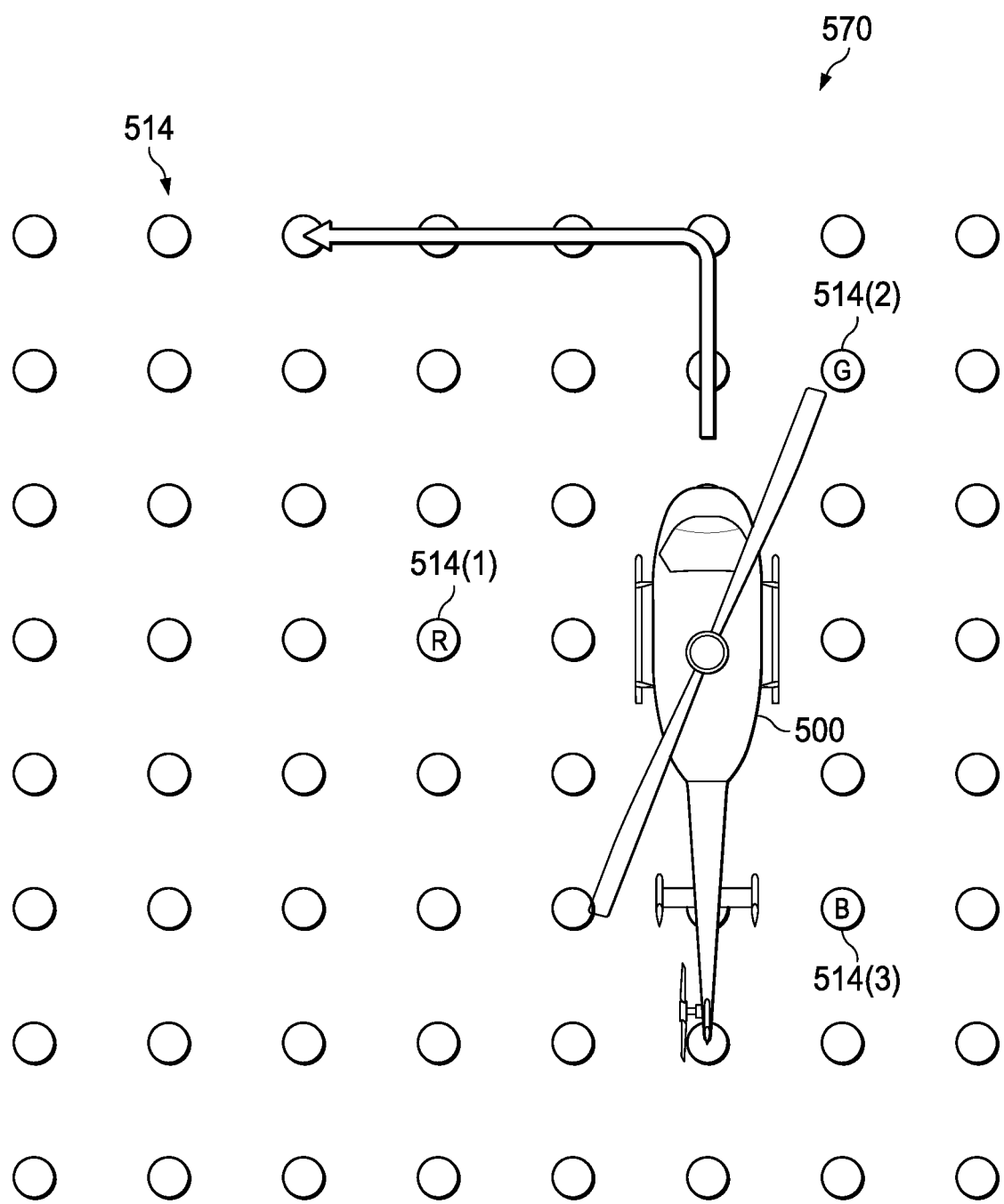
FIG. 5 illustrates an example of a landing area that includes an arrangement of emitters.

FIG. 5 illustrates an example of a landing area 570. The landing area 570 includes an arrangement of emitters 514 and an aircraft 500 for which a take-off event is to be executed. The emitters 514 can be, for example, the same emitters as the emitters 314 of FIG. 3 and the emitters 414 of FIGS. 4A-B. The aircraft 500 can be, for example, the same aircraft represented by the aircraft 400 of FIG. 4. In the illustrated embodiment, the emitters 514 are arranged in a graph or grid formation in similar fashion to the emitters 414 of FIG. 4.

In the illustrated embodiment, all except three of the emitters 514 are producing no emissions according to a corresponding emission state in which no emissions are produced. Emitter 514(1) is emitting red light, emitter 514(2) is emitting green light and emitter 514(3) is emitting blue light. It should be appreciated that red light, blue light and green light are simply illustrative examples of emissions that can be individually distinguishable, for example, by sensors in use on an aircraft. As described previously, in various embodiments, the emitters 514(1), 514(2) and 514(3) can emit electromagnetic radiation corresponding to various frequencies throughout the electromagnetic spectrum, such as radio waves, infrared light, visible light, combinations of same and/or the like.

According to an example communication protocol, the emitters 514(1), 514(2) and 514(3) can convey an instruction set for a take-off event to be executed by the aircraft 500. In one aspect, the emitters 514(1), 514(2) and 514(3) can define a region within the landing area for the take-off event, such that the region is at least partially bound, or demarcated, by the emitters 514(1), 514(2) and 514(3). In another aspect, the emitters 514(2) and 514(3) can further indicate an orientation of the aircraft for the take-off event, where the green light of the emitter 514(2) can indicate a direction of a starboard side of a front of the aircraft and the blue light of the emitter 514(3) can indicate a direction of a starboard side of a tail section of the aircraft. In yet another aspect, the red light of the emitter 514(1) can indicate a direction or shape for initial flight heading. In the example of FIG. 5, the indicated direction for initial flight heading is a 90-degree left turn.

In some embodiments, other types of instructions for the take-off event can also be conveyed. For example, in some cases, additional emitters of the emitters 514 can be caused to emit according to a particular emission state so as to indicate a direction of passenger embarkation or cargo loading. Other types of instructions for a take-off event will be apparent to one skilled in the art after reviewing the present disclosure.

Figure 6:
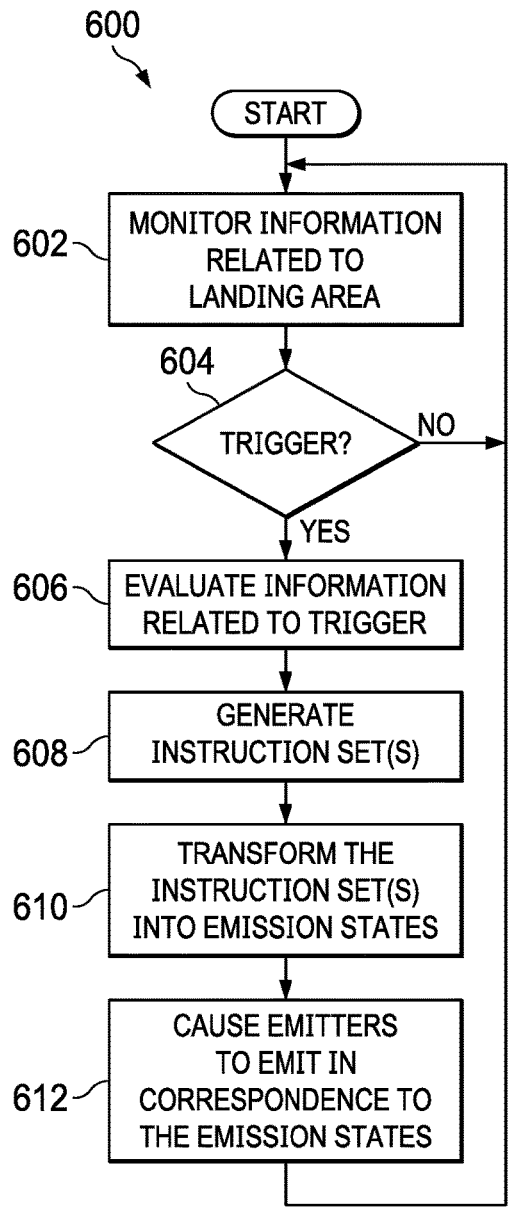
FIG. 6 illustrates an example of a process for causing emitters to produce emission states representative of instruction sets.

FIG. 6 illustrates an example of a process 600 for causing emitters to produce emission states representative of instruction sets. In an example, the process 600 can be executed by the landing area controller 202 or the landing area monitor 204 of FIG. 2. In yet another example, the process 600 can be executed generally by the ground control system 190 of FIG. 1 and/or the ground control system 290 of FIG. 2. Although the process 600 can be executed by any number of different components, to simplify discussion, the process 600 will be described relative to specific components of the ground control system 290 of FIG. 2.

At block 602, the landing area controller 202 monitors information related to the landing area managed by the ground control system 290 for any information that would trigger generation of an instruction set. In an example, the trigger can be receipt of an advance indication of a take-off or landing event to be executed by an aircraft. According to this example, the landing area controller 202 can monitor for the advance indication. The advance indication can be received in various fashions. In some cases, the advance indication can result from the aircraft, via its pilot or flight control system, requesting to land in, or take-off from, the landing area. In other cases, the advance indication can result from an automatic identification based on, for example, detecting an approach of the aircraft to the landing area. In still other cases, the advance indication can be received from a user of the ground control system 290, for example, as a result of the user's communication with a pilot of the aircraft.

In another example, in certain embodiments, the landing area controller 202 can monitor for trigger events generated by the landing area monitor 204, where each trigger event can serve as a trigger. In yet another example, the trigger can be, for example, a manual trigger by users or personnel at the landing area. Other examples of triggers will be apparent to one skilled in the art after reviewing the present disclosure.

At decision block 604, the landing area controller 202 determines whether a trigger has been identified. If not, the process 600 returns to block 602 and proceeds as described previously. Otherwise, if it is determined at the decision block 604 that a trigger has been identified, the process 600 proceeds to block 606. At block 606, the landing area controller 202 evaluates information related to the trigger. In general, the block 606 can include accessing or generating information that will be used for instruction-set generation. For example, the block 606 can include the landing area controller 202 identifying each take-off or landing event involved in or implicated by the trigger and determining the corresponding aircraft for each such take-off or landing event. In some cases, this information can be provided with the trigger or be received via user input.

At block 608, the landing area controller 202 generates one or more instruction sets. Generally, the block 608 includes generating an instruction set for each take-off or landing event implicated by the trigger. Each instruction set can be generated in the fashion described above relative to FIG. 2. In many cases, a newly-generated instruction set can be an update to or cancellation of a previous instruction set. For example, a new instruction set might indicate a new region of the landing area for a particular landing event, where a different region had been previously indicated. In another example, a new instruction set, due to weather, might cancel a previously-planned landing event, such that the new instruction set, in effect, includes an instruction not to land.

At block 610, the landing area controller 202 transforms the instruction sets into emission states of the emitters 214. In general, the block 610 can include translating, converting and/or mapping the instruction sets to the emission states as described with respect to FIG. 2, where the emission states can correspond to states that are previously established and stored in the configurations 218.

At block 612, the landing area controller 202 causes the emitters 214 to produce emissions in correspondence to the emission states. FIGS. 3, 4A-B and 5, described above, are examples of emissions that can result from the block 612. In the case of emissions similar to FIGS. 4A-B and 5, the emitters 214 can convey instruction sets that are new and/or replace or cancel previous instruction sets. In some cases, such as when a previously-planned take-off or landing event is cancelled, the emissions produced by the emitters 214 can appear similar to the example of FIG. 3, where no emissions are produced, so as to convey an instruction not to land. From block 612, the process 600 returns to block 602 and again monitors for triggers. In various embodiments, the process 600 can continue, for example, until terminated by a user or suitable stop criteria is satisfied.

Figure 7:
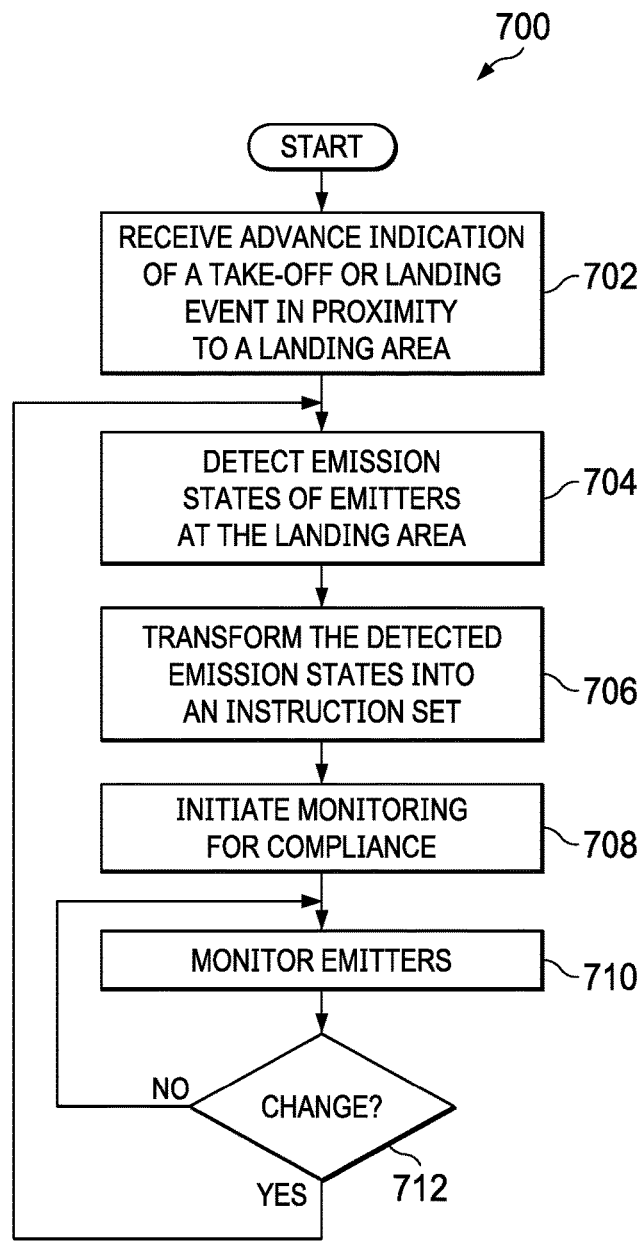
FIG. 7 illustrates an example of a process for determining an instruction set from emitters in use at a landing area.

FIG. 7 illustrates an example of a process 700 for determining an instruction set from emitters in use at a landing area. In an example, the process 700 can be executed by the instruction detector 222(1), the instruction detector 222(2) and/or the instruction detector 222(N) of FIG. 2. In yet another example, the process 700 can be executed generally by the flight control system 280(1), the flight control system 280(2) and/or the flight control system 280(N) of FIG. 2 and/or the flight control system 180 of FIG. 1. Although the process 700 can be executed by any number of different components, to simplify discussion, the process 700 will be described relative to specific components of the flight control system 280(1) of FIG. 2.

At block 702, the instruction detector 222(1) receives an advance indication of a take-off or landing event to be executed by the aircraft on which the flight control system 280 resides. In some cases, the advance indication can be received from a pilot or remote pilot. In other cases, such as in autonomous scenarios, the advance indication can be identified by the flight control system 280 as a result of the aircraft approaching the landing area.

At block 704, responsive to the advance indication, the instruction detector 222(1) detects, via one or more of the sensors 228(1), emission states of at least some of the emitters 214. In a typical embodiment, the detected emission states can be any of the emission states described with respect to FIG. 2. Examples of particular emission states are shown with respect to FIGS. 3, 4A-B and 5 and are described above.

At block 706, the instruction detector 222(1) transforms the detected emission states into an instruction set for the take-off or landing event to be executed by the aircraft. The transformation can involve, for example, translating, converting and/or mapping the detected emission states to particular instructions of the instruction set according to the pre-arranged communication protocol. At block 708, the instruction detector 222(1) initiates compliance monitoring, for example, by the compliance monitor 224(1), as the aircraft executes the take-off or landing event. At block 710, the instruction detector 222(1) monitors the emitters 214 for emission changes, i.e., changes in what is being emitted by one or more of the emitters 214.

At decision block 712, the instruction detector 222(1) determines whether at least one change in the emitters 214 has been detected. If so, the process 700 returns to block 704 for detection of emission states as described previously. Otherwise, if it is determined at the decision block 712 that no change has been detected, the process 700 returns to block 710 and continues to monitor the emitters 214. In various embodiments, the process 700 can continue until the aircraft has executed the take-off or landing event, until the process 700 is terminated by a pilot or user, or until other suitable stop criteria is satisfied.

Figure 8:
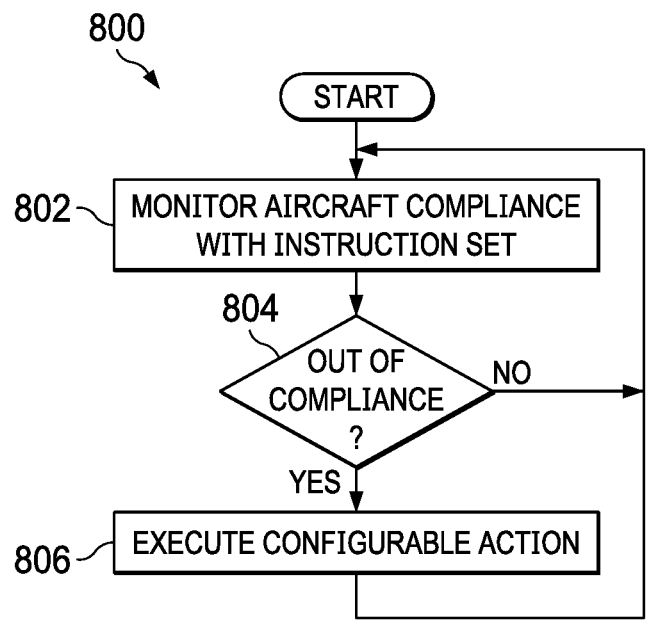
FIG. 8 illustrates an example of a process for monitoring aircraft compliance with an instruction set.

FIG. 8 illustrates an example of a process 800 for monitoring aircraft compliance with an instruction set. In certain embodiments, the process 800 can be executed on a ground control system such as the ground control system 290 of FIG. 2 and/or on a flight control system such as one or more of the flight control systems 280 of FIG. 2. In that way, compliance can be monitored via sensors in use at a landing area, such as the sensors 216 of FIG. 2, and/or via sensors in use on an aircraft, such as the sensors 228(1), 228(2) and 228(N) of FIG. 2.

In particular, in the case of the process 800 being executed on a ground control system such as the ground control system 290, the process 800 can be performed, for example, by the compliance monitor 206, and can execute in parallel for each of a plurality of aircraft relative to a plurality of different instruction sets. Further, in the case of the process 800 being executed on a flight control system such as one or more of the flight control systems 280 of FIG. 2, the process 800 can be performed, for example, by one or more of the compliance monitors 224(1), 224(2) and 224(N), and can be executed relative to an instruction set that has been detected in the fashion described relative to FIG. 7. Although the process 800 can be executed by any number of different components in a variety of different locations, for simplicity of description, the process 800 will be described generically with reference to a compliance monitor that monitors a particular aircraft relative to a particular instruction set using particular sensors.

At block 802, the compliance monitor monitors compliance of the particular aircraft with the particular instruction set. In various embodiments, the compliance monitor can use information from the particular sensors to determine whether the particular aircraft is being piloted in a manner inconsistent with the particular instruction set. In general, the compliance monitor can determine a particular location or orientation of the particular aircraft in any of the ways described above relative to the compliance monitor 206 and the compliance monitor 224(1), both of FIG. 2. In that way, the compliance monitor can determine an absolute location or position of the particular aircraft, an absolute orientation of the particular aircraft, a location or position of the particular aircraft relative to individual emitters in use at the landing area (or relative to the landing area as a graph or grid), an orientation of the aircraft relative to individual emitters in use at the landing area (or relative to the landing area as a graph or grid), combinations of the foregoing and/or the like.

For example, in some embodiments, the compliance monitor can dynamically define an area in flight space such that, if the particular aircraft moves out of the area, the particular aircraft is deemed to be out of compliance. In another example, the compliance monitor can define a section of the landing area such that, if the particular aircraft is found to be located in or positioned relative to a part of the landing area that is not within the defined section, the particular aircraft is deemed to be out of compliance. In yet another example, the compliance monitor can define what constitutes a valid orientation, for example, in terms of maximum distances of sections of the particular aircraft from individual emitters in use at the landing area. According to this example, if the particular aircraft is determined to be in an invalid orientation, the particular aircraft can be deemed to be out of compliance. In still another example, non-compliance can be indicated, for example, by users in proximity to a ground control system such as the ground control system 290.

At decision block 804, the compliance monitor determines whether the particular aircraft is out of compliance with the particular instruction set. If it is not determined at the decision block 804 that the particular aircraft is out of compliance with the particular instruction set, the process 800 returns to block 802 and executes as described previously. Otherwise, if it is determined at the decision block 804 that the particular aircraft is out of compliance, the process 800 proceeds to block 806.

At block 806, the compliance monitor can execute configurable action to remediate the non-compliance and/or notify appropriate users or personnel. For example, the compliance monitor can cause an alerting module such as the alerting module 208 to produce an alert on the ground control system 290. In another example, the compliance monitor can cause an alerting module, such as one of the alerting modules 226(1), 226(2) and 226(N), to produce an alert on the particular aircraft. From block 806, the process 800 returns to block 802 and executes as described previously. In various embodiments, the process 800 can continue until the particular aircraft has executed a given take-off or landing event, until the process 800 is terminated by a pilot or user, or until other suitable stop criteria is satisfied.

Figure 9:
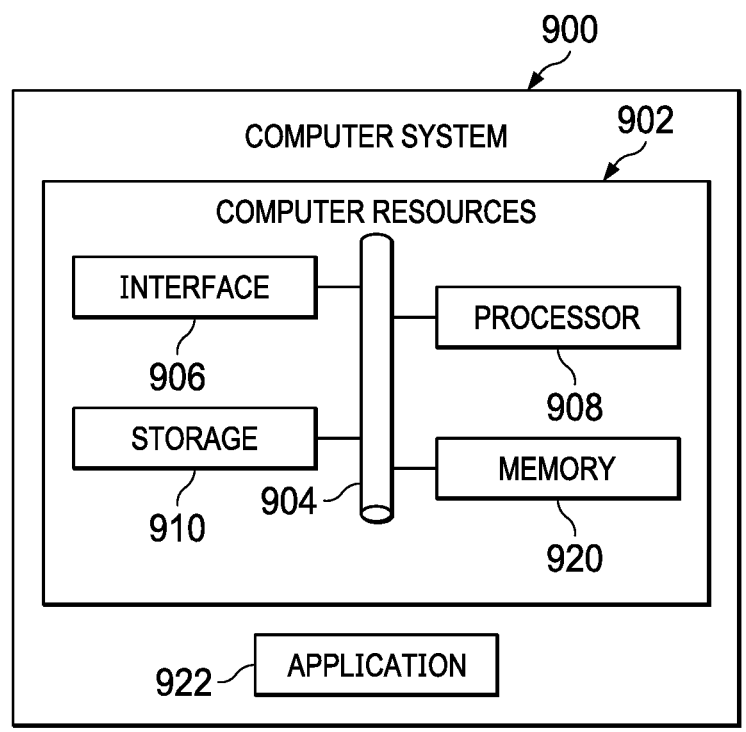
FIG. 9 illustrates an example of a computer system.

FIG. 9 illustrates an example of a computer system 900. In some cases, the computer system 900 can be representative, for example, of a flight control system such as, for example, the flight control system 180 of FIG. 1, any of the flight control systems 280 of FIG. 2, and/or any components of the foregoing control systems. The computer system 900 can also be representative, for example, of the ground control system 190, the ground control system 290 and/or any components of the foregoing control systems. The computer system 900 includes an application 922 operable to execute on computer resources 902. The application 922 can include, for example, logic for determining what control filter, if any, to implement, what control signal to send to an actuator, filter-specific logic, combinations of the foregoing and/or the like. In particular embodiments, the computer system 900 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 900 may include any suitable physical form, configuration, number, type and/or layout. As an example, and not by way of limitation, the computer system 900 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 900 may include one or more computer systems; be unitary or distributed; span multiple locations; span multiple machines; or reside in a cloud, which may include one or more cloud components in one or more networks.

In the depicted embodiment, the computer system 900 includes a processor 908, memory 920, storage 910, interface 906 and bus 904. Although a particular computer system is depicted having a particular number of particular components in a particular arrangement, this disclosure contemplates any suitable computer system having any suitable number of any suitable components in any suitable arrangement.

Processor 908 may be a microprocessor, controller, or any other suitable computing device, resource, or combination of hardware, software and/or encoded logic operable to execute, either alone or in conjunction with other components, (e.g., memory 920), the application 922. Such functionality may include providing various features discussed herein. In particular embodiments, processor 908 may include hardware for executing instructions, such as those making up the application 922. As an example, and not by way of limitation, to execute instructions, processor 908 may retrieve (or fetch) instructions from an internal register, an internal cache, memory 920, or storage 910; decode and execute them; and then write one or more results to an internal register, an internal cache, memory 920, or storage 910.

In particular embodiments, processor 908 may include one or more internal caches for data, instructions, or addresses. This disclosure contemplates processor 908 including any suitable number of any suitable internal caches, where appropriate. As an example, and not by way of limitation, processor 908 may include one or more instruction caches, one or more data caches and one or more translation lookaside buffers (TLBs). Instructions in the instruction caches may be copies of instructions in memory 920 or storage 910 and the instruction caches may speed up retrieval of those instructions by processor 908. Data in the data caches may be copies of data in memory 920 or storage 910 for instructions executing at processor 908 to operate on; the results of previous instructions executed at processor 908 for access by subsequent instructions executing at processor 908, or for writing to memory 920, or storage 910; or other suitable data. The data caches may speed up read or write operations by processor 908. The TLBs may speed up virtual-address translations for processor 908. In particular embodiments, processor 908 may include one or more internal registers for data, instructions, or addresses. Depending on the embodiment, processor 908 may include any suitable number of any suitable internal registers, where appropriate. Where appropriate, processor 908 may include one or more arithmetic logic units (ALUs); be a multi-core processor; include one or more processors 908; or any other suitable processor.

Memory 920 may be any form of volatile or non-volatile memory including, without limitation, magnetic media, optical media, random access memory (RAM), read-only memory (ROM), flash memory, removable media, or any other suitable local or remote memory component or components. In particular embodiments, memory 920 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 920 may include one or more memories 920, where appropriate. Memory 920 may store any suitable data or information utilized by the computer system 900, including software embedded in a computer readable medium and/or encoded logic incorporated in hardware or otherwise stored (e.g., firmware). In particular embodiments, memory 920 may include main memory for storing instructions for processor 908 to execute or data for processor 908 to operate on. In particular embodiments, one or more memory management units (MMUs) may reside between processor 908 and memory 920 and facilitate accesses to memory 920 requested by processor 908.

As an example, and not by way of limitation, the computer system 900 may load instructions from storage 910 or another source (such as, for example, another computer system) to memory 920. Processor 908 may then load the instructions from memory 920 to an internal register or internal cache. To execute the instructions, processor 908 may retrieve the instructions from the internal register or internal cache and decode them. During or after execution of the instructions, processor 908 may write one or more results (which may be intermediate or final results) to the internal register or internal cache. Processor 908 may then write one or more of those results to memory 920. In particular embodiments, processor 908 may execute only instructions in one or more internal registers or internal caches or in memory 920 (as opposed to storage 910 or elsewhere) and may operate only on data in one or more internal registers or internal caches or in memory 920 (as opposed to storage 910 or elsewhere).

In particular embodiments, storage 910 may include mass storage for data or instructions. For example, in various embodiments, storage 910 can store configurations such as the configurations 218 of FIG. 2. As an example, and not by way of limitation, storage 910 may include a hard disk drive (HDD), a floppy disk drive, flash memory, an optical disc, a magneto-optical disc, magnetic tape, or a Universal Serial Bus (USB) drive or a combination of two or more of these. Storage 910 may include removable or non-removable (or fixed) media, where appropriate. Storage 910 may be internal or external to the computer system 900, where appropriate. In particular embodiments, storage 910 may be non-volatile, solid-state memory. In particular embodiments, storage 910 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 910 may take any suitable physical form and may include any suitable number or type of storage. Storage 910 may include one or more storage control units facilitating communication between processor 908 and storage 910, where appropriate.

In particular embodiments, interface 906 may include hardware, encoded software, or both providing one or more interfaces for communication (such as, for example, packet-based communication) among any networks, any network devices and/or any other computer systems. As an example, and not by way of limitation, communication interface 906 may include a network interface controller (NIC) or network adapter for communicating with an Ethernet or other wire-based network and/or a wireless NIC (WNIC) or wireless adapter for communicating with a wireless network.

Depending on the embodiment, interface 906 may be any type of interface suitable for any type of network for which computer system 900 is used. As an example, and not by way of limitation, computer system 900 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 900 may include any suitable interface 906 for any one or more of these networks, where appropriate.

In some embodiments, interface 906 may include one or more interfaces for one or more I/O devices. One or more of these I/O devices may enable communication between a person and the computer system 900. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 906 for them. Where appropriate, interface 906 may include one or more drivers enabling processor 908 to drive one or more of these I/O devices. Interface 906 may include one or more interfaces 906, where appropriate.

Bus 904 may include any combination of hardware, software embedded in a computer readable medium and/or encoded logic incorporated in hardware or otherwise stored (e.g., firmware) to couple components of the computer system 900 to each other. As an example, and not by way of limitation, bus 904 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 904 may include any number, type and/or configuration of buses 904, where appropriate. In particular embodiments, one or more buses 904 (which may each include an address bus and a data bus) may couple processor 908 to memory 920. Bus 904 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 908 (such as, for example, one or more internal registers or caches), one or more portions of memory 920, one or more portions of storage 910, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described and pointed out novel features as applied to various embodiments, it will be understood that various omissions, substitutions and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system in an aircraft:
   receiving an advance indication of a take-off or landing event to be executed by the aircraft in proximity to a landing area, the landing area comprising an arrangement of a plurality of emitters of electromagnetic radiation;
   responsive to the receiving, detecting, via a sensor in communication with the computer system, emission states of at least some of the plurality of emitters;
   transforming the detected emission states into an instruction set for the take-off or landing event, wherein the instruction set indicates a first region of the landing area for the take-off or landing event;
   initiating monitoring of the aircraft relative to the instruction set as the aircraft executes the take-off or landing event in proximity to the landing area;
   monitoring the plurality of emitters for emission changes;
   responsive to the monitoring, detecting an emission change in at least one emitter of the plurality of emitters;
   responsive to the detected emission change, detecting current emission states of at least selected emitters of the plurality of emitters;
   transforming the current emission states into a new instruction set, wherein the new instruction set indicates a second region of the landing area for the take-off or landing event such that the second region is different from the first region; and
   initiating monitoring of the aircraft relative to the new instruction set.

2. The method of claim 1, comprising:
   monitoring compliance of the aircraft with the instruction set; and
   responsive to a determination that the aircraft is out of compliance, causing an alert to be produced.

3. The method of claim 2, wherein the monitoring comprises:
   determining, relative to at least one emitter of the plurality of emitters, at least one of a location of the aircraft and an orientation of the aircraft; and
   determining whether the aircraft is out of compliance with the instruction set based, at least in part, on the determined at least one of a location of the aircraft and an orientation of the aircraft.

4. The method of claim 1, wherein the aircraft comprises a vertical take-off and landing (VTOL) aircraft.

5. The method of claim 1, wherein;
   the first region is at least partially bound by at least selected emitters of the plurality of emitters.

6. The method of claim 5, wherein the instruction set indicates at least one of:
   an orientation of the aircraft in the first region; and
   a direction of an initial flight heading.

7. The method of claim 1, wherein the arrangement of the plurality of emitters comprises a grid such that the plurality of emitters correspond to cells of the grid.

8. The method of claim 7, wherein the instruction set expresses the first region as one or more of the cells of the grid.

9. A computer-program product comprising a non-transitory computer-usable medium having computer-readable program code embodied therein, the computer-readable program code adapted to be executed to implement a method comprising:
   receiving an advance indication of a take-off or landing event to be executed by an aircraft in proximity to a landing area, the landing area comprising an arrangement of a plurality of emitters of electromagnetic radiation;
   responsive to the receiving, detecting, via a sensor, emission states of at least some of the plurality of emitters;
   transforming the detected emission states into an instruction set for the take-off or landing event, wherein the instruction set indicates a first region of the landing area for the take-off or landing event;
   initiating monitoring of the aircraft relative to the instruction set as the aircraft executes the take-off or landing event in proximity to the landing area;

monitoring the plurality of emitters for emission changes;
responsive to the monitoring, detecting an emission change in at least one emitter of the plurality of emitters;
responsive to the detected emission change, detecting current emission states of at least selected emitters of the plurality of emitters;
transforming the current emission states into a new instruction set, wherein the new instruction set indicates a second region of the landing area for the take-off or landing event such that the second region is different from the first region; and
initiating monitoring of the aircraft relative to the new instruction set.

\* \* \* \* \*